United States Patent
Barghoorn et al.

(10) Patent No.: US 7,183,349 B1
(45) Date of Patent: Feb. 27, 2007

(54) STYRENE COPOLYMERS WITH IMPROVED RESISTANCE TO CHEMICALS

(75) Inventors: Peter Barghoorn, Kallstadt (DE); Michael Fischer, Ludwigshafen (DE); Heiner Görrissen, Ludwigshafen (DE); Peter Ittemann, Lampertheim (DE); Norbert Niessner, Friedelsheim (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/936,353

(22) PCT Filed: Mar. 10, 2000

(86) PCT No.: PCT/EP00/02110

§ 371 (c)(1),
(2), (4) Date: Sep. 11, 2001

(87) PCT Pub. No.: WO00/53670

PCT Pub. Date: Sep. 14, 2000

(30) Foreign Application Priority Data

Mar. 11, 1999 (DE) .............................. 199 10 917

(51) Int. Cl.
*C08K 3/34* (2006.01)

(52) U.S. Cl. .................................... 524/449; 524/521
(58) Field of Classification Search ................ 524/449, 524/521

See application file for complete search history.

(56) References Cited

U.S. PATENT DOCUMENTS

| 3,951,906 | A | * | 4/1976 | Farber et al. | ............... 523/220 |
| 4,889,885 | A | | 12/1989 | Usuki et al. | ................ 524/445 |
| 5,814,688 | A | * | 9/1998 | Hilti et al. | ..................... 524/9 |
| 6,197,849 | B1 | * | 3/2001 | Zilg et al. | ................... 523/216 |
| 6,448,316 | B1 | * | 9/2002 | Hirano et al. | ............... 524/127 |

FOREIGN PATENT DOCUMENTS

| DE | 38 06 548 | 9/1988 |
| DE | 19630062 | 1/1998 |

* cited by examiner

*Primary Examiner*—Peter D. Mulcahy
(74) *Attorney, Agent, or Firm*—Novak Druce & Quigg LLP

(57) ABSTRACT

The invention relates to the use of phyllosilicates for improving the chemicals resistance, reducing the swelling, and improving the stress-cracking resistance of styrene copolymers, and to corresponding styrene copolymers, and to a process for their preparation.

19 Claims, No Drawings

STYRENE COPOLYMERS WITH IMPROVED RESISTANCE TO CHEMICALS

The invention relates to styrene copolymers with improved chemicals resistance.

Styrene copolymers have very good properties and are therefore versatile in use. However, for various applications it is desirable that their property profile be improved. Improvement of this type may be achieved by adding other components to a styrene copolymer mixture.

EP-A 0 590 390 discloses thermoplastic molding compositions which have a better shade of color, even after processing to give the finished molding. This improvement in the shade of the unprocessed thermoplastic molding compositions is achieved by adding zeolites or phyllosilicates of kaolin type, serpentine type, and bentonite type.

H. Domininghaus, Plastics for Engineers, Carl Hanser Verlag, Munich, 1993, chapter 17, p. 213 discloses that the chemicals resistance of SAN (styrene-acrylonitrile copolymers) rises as acrylonitrile content rises.

It is an object of the present invention to provide a further improvement in the chemicals resistance of styrene copolymers, in particular of styrene copolymers with low acrylonitrile contents.

We have found that this object is achieved by using phyllosilicates for improving the chemicals resistance, reducing the swelling, and improving the stress-cracking resistance of styrene copolymers.

Improvement in the chemicals resistance, low swelling, and improved stress-cracking resistance of the styrene copolymers can widen the scope of application of these polymers.

The use according to the invention of phyllosilicates in styrene copolymers particularly improves the chemicals resistance with respect to chemicals selected from alcohols, such as methanol, ethanol, isopropanol, $C_3$–$C_8$ alkanes, gasoline, premium gasoline, diesel, halogenated hydrocarbons, hypochlorite salts, and sodium dichloroisocyanate dihydrate.

Examples of suitable phyllosilicates are described in Hollemann, Wiberg, Lehrbuch der anorganischen Chemie, Walter de Gruyter, Berlin, N.Y. 1985, pp. 771–776. It is preferable to use phyllosilicates selected from kaolinite types, serpentine types, pyrophyllite, micaceous silicates, and mica, and mica is very particularly preferred.

For the purposes of the present invention, styrene copolymers are copolymers which have been built up from styrene or from styrene derivatives and from comonomers and, where appropriate, from other components.

It is preferable to use phyllosilicates in styrene copolymers which (including the phyllosilicate) have been built up from components A, C, and, where appropriate, B, D, and E, using:

a: as component A, from 20 to 100% by weight, based on the entirety of components A+B, of a hard component made from one or more copolymers of styrene and/or α-methylstryrene with acrylonitrile, the proportion of acrylonitrile being from 10 to 50% by weight, b: from 0 to 80% by weight, based on the entirety of components A+B, of at least one graft copolymer B made from b1: as component B1, from 10 to 90% by weight of at least one elastomeric particulate graft base with a glass transition temperature below 0° C., and b2: as component B2, from 10 to 90% by weight of at least one graft made from polystyrene or from a copolymer of styrene and/or α-methylstyrene with acrylonitrile, the proportion of acrylonitrile being from 10 to 50% by weight, where the entirety of the components A+B used is from 10 to 100 parts by weight, based on the total weight of the components used, c: as component C, from 0.05 to 5 parts by weight, based on the total weight of the components used, of a phyllosilicate, d: as component D, from 0 to 90 parts by weight, based on the total weight of the components used, of at least one polycarbonate, and e: as component E, from 0 to 20 parts by weight, based on the total weight of the components used, of other conventional auxiliaries and fillers.

Examples of styrene copolymers suitable for addition of phyllosilicates to increase chemicals resistance and having components A, B, D, and E are described in DE-A 29 01 576 and DE-A 38 21 481.

In the styrene copolymers, the proportion of component A, based on the entirety of components A+B, is preferably from 40 to 90% by weight, particularly preferably from 55 to 80% by weight. The proportion of component B, based on the entirety of components A+B, is preferably from 15 to 60% by weight, particularly preferably from 20 to 45% by weight, and the entirety of components A+B is preferably from 10 to 80 parts by weight, particularly preferably from 12 to 70 parts by weight, based on the total weight of the components used. The proportion of component C, based on the total weight of the components used, is preferably from 0.15 to 5 parts by weight, particularly preferably from 0.15 to 3 parts by weight. The proportion of component D, based on the total weight of the components used, is preferably from 20 to 90 parts by weight, particularly preferably from 33 to 90 parts by weight, very particularly preferably from 60 to 90 parts by weight. The proportion of component E, based on the total weight of the components used, is preferably from 0 to 15 parts by weight, particularly preferably from 0 to 12 parts by weight.

In component A, the proportion of acrylonitrile is preferably less than 28% by weight, particularly preferably from 18 to 27% by weight.

In component B, the proportion of component B1 is preferably from 20 to 80% by weight, particularly preferably from 25 to 75% by weight, and the proportion of component B2 is preferably from 20 to 80% by weight, particularly preferably from 25 to 75% by weight. The proportion of acrylonitrile in component B2 here is preferably less than 28% by weight, particularly preferably from 18 to 27% by weight.

Phyllosilicates suitable as component C are preferably those selected from kaolinite types, serpentine types, pyrophyllite, micaceous silicates, and mica, and particular preference is given to mica. For the purposes of the present invention, kaolinite types include kaolin and micaceous silicates include bentonite.

Component A

Component A preferably has a viscosity number VN (determined to DIN 53726 at 25° C., 0.5% strength by weight in dimethylformamdide) of from 50 to 120 ml/g, particularly preferably from 52 to 110 ml/g, and in particular from 55 to 100 ml/g. It is particularly preferably a styrene-acrylonitrile copolymer. Copolymers of this type are obtained in a known manner by bulk, solution, suspension, precipitation, or emulsion polymerization, preferably bulk or solution polymerization. Examples of details of these processes are described in Kunststoffhandbuch, editors R.

Vieweg and G. Daumiller, Volume V "Polystyrol", Carl-Hanser-Verlag Munich, 1969, p. 118 ff.

Component B

Component B is a graft copolymer with an elastomeric particulate graft base with a glass transition temperature below 0° C. This graft base may have been selected from any of the known suitable elastomeric polymers. It is preferably ABS (acrylonitrile-butadiene-styrene) rubber or ASA (acrylonitrile-styrene-alkyl acrylate) rubber, and use may also be made here of a styrene derivative instead of styrene and of another diene instead of butadiene, or is EPDM rubber, siloxane rubber, or another rubber.

Component B1 is preferably at least one (co)polymer made from b11: as component B11, from 60 to 100% by weight, preferably from 70 to 100% by weight, of at least one conjugated diene, one $C_1$–$C_{10}$-alkyl acrylate, or a mixture of these, b12: as component B12, from 0 to 30% by weight, preferably from 0 to 25% by weight, of at least one monoethylenically unsaturated monomer other than component B11, and b13: as component B13, from 0 to 10% by weight, preferably from 0 to 6% by weight, of at least one crosslinking monomer.

Compounds which may be used as component B11 are conjugated dienes, in particular butadiene, isoprene, chloroprene, and mixtures of these, and also the $C_1$–$C_{10}$-alkyl acrylates listed below, preferably $C_1$–$C_8$-alkyl acrylates, and mixtures of these. It is preferable to use butadiene or isoprene or a mixture of these, specifically butadiene, or n-butyl acrylate.

Where appropriate, the monomers present as component B12 may be those which vary the mechanical and thermal properties of the core within a certain range. Examples of monoethylenically unsaturated comonomers of this type which may be used are styrene, substituted styrenes, acrylonitrile, methacrylonitrile, acrylic acid, methacrylic acid, dicarboxylic acids, such as maleic acid and fumaric acid, and also anhydrides of these, such as maleic anhydride, nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide, $C_1$–$C_{10}$-alkyl esters of acrylic acid, such as methyl acrylate, ethyl acrylate, n-propyl acrylate, isopropyl acrylate, n-butyl acrylate, isobutyl acrylate, sec-butyl acrylate, tert-butyl acrylate, ethylhexyl acrylate, the corresponding $C_1$–$C_{10}$-alkyl esters of methacrylic acid, and also hydroxyethyl acrylate, aromatic or araliphatic esters of acrylic acid or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate, and also 2-phenoxyethyl methacrylate, N-substituted maleimide, such as N-methyl-, N-phenyl-, and N-cyclohexylmaleimide, and unsaturated ethers, such as vinyl methyl ether, and also mixtures of these.

Preference is given to the use of styrene, α-methylstryrene, n-butyl acrylate, methyl methacrylate, acrylonitrile, or a mixture of these as component B12, in particular styrene and n-butyl acrylate or a mixture of these, and specifically styrene. If use is made of a component B12, but not of any component B13, the proportion of B11 is preferably from 70 to 99.9% by weight, particularly preferably from 90 to 99% by weight, and the proportion of component B12 is preferably from 0.1 to 30% by weight, particularly preferably from 1 to 10% by weight. Particular preference is given to butadiene-styrene copolymers and n-butyl acrylate-styrene copolymers, the amounts being within the range given.

Examples of crosslinking monomers of component B13 are divinyl compounds, such as divinylbenzene, diallyl compounds, such as diallyl maleate, allyl esters of acrylic or methacrylic acid, dihydrodicyclopentadienyl acrylate (DCPA), divinyl esters of dicarboxylic acids, such as those of succinic acid or of adipic acid, and the diallyl or divinyl ethers of dihydric alcohols, such as those of ethylene glycol or of 1,4-butanediol.

The graft B2 used is preferably styrene, α-methylstyrene, or else styrenes with $C_1$–$C_8$-alkyl ring substitution. Particular preference is given to styrene. However, it is also possible to use mixtures of the styrenes mentioned.

B2 may also comprise one or more other monoethylenically unsaturated comonomers. Preferred comonomers are acrylonitrile, methyl methacrylate, glycidyl acrylate, glycidyl methacrylate, acrylamide, and methacrylamide.

Examples of preferred grafts B2 are polystyrene and copolymers made from styrene and/or α-methylstyrene with acrylonitrile and/or methyl methacrylate.

It is particularly preferable for the proportion of styrene and/or 2-methylstyrene, or the total of these, to be at least 50% by weight, and very particularly preferably at least 60% by weight.

In another embodiment it is also possible to use graft rubbers such as those used in DE-A-4 011 163. These graft rubbers are known to the skilled worker by the term acid-base rubbers.

The graft copolymers B are usually prepared by emulsion polymerization. This polymerization generally takes place at from 20 to 100° C., preferably from 30 to 80° C. Concomitant use is frequently made of conventional emulsifiers, such as alkali metal alkyl- or alkylarylsulfonates, alkyl sulfates, fatty alcohol sulfonates, salts of higher fatty acids having from 10 to 30 carbon atoms, sulfosuccinates, ether sulfonates, or resin soaps. It is preferable to use the alkali metal salts, in particular the sodium or potassium salts of alkylsulfonates, or fatty acids having from 10 to 18 carbon atoms.

Emulsifiers are generally used in amounts of from 0.5 to 5% by weight, in particular from 0.5 to 3% by weight, based on the monomers used in preparing the graft base.

In preparing the dispersion, it is preferable to use sufficient water to give the finished dispersion a solids content of from 20 to 50% by weight. A water/monomer ratio of from 2:1 to 0.7:1 is usually used.

Suitable free-radical generators for initiating the polymerization are those which decompose at the selected reaction temperature, i.e. those which decompose thermally by themselves and those which do so in the presence of a redox system. Examples of preferred polymerization initiators are free-radical generators such as peroxides, preferably peroxosulfates (such as sodium peroxodisulfate or potassium peroxodisulfate) and azo compounds, such as azodiisobutyronitrile. However, it is also possible to use redox systems, especially those based on hydroperoxides, such as cumine hydroperoxide.

The polymerization initiators are generally used in amounts of from 0.1 to 1% by weight, based on the graft base monomers.

The free-radical generators and the emulsifiers are added to the reaction mixture, for example by adding the total amount batchwise at the beginning of the reaction, or by batchwise addition, divided into a number of portions, at the beginning and at one or more later times, or continuously over a defined period. Continuous addition may also follow a gradient which may, for example, rise or fall and be linear or exponential or else follow a step function.

Concomitant use may also be made of molecular weight regulators, such as ethylhexyl thioglycolate, n- or tert-dodecyl mercaptan, or other mercaptans, terpinols, or dimeric methylstyrene, or other compounds suitable for regulating molecular weight. The molecular weight regulators are added to the reaction mixture batchwise or continuously, as described for the free-radical generators and emulsifiers.

To maintain a constant pH, preferably from 6 to 9, concomitant use may be made of buffer substances, such as $Na_2HPO_4/NaH_2PO_4$, sodium hydrogencarbonate, or buffers based on citric acid/citrate. The amounts used of regulators and buffer substances are those which are usual, and it is therefore unnecessary to give further details in this connection.

In one particular embodiment, the graft base may also be prepared by polymerizing the monomers B1 in the presence of a finely divided latex (using the seed-latex polymerization procedure). This latex forms an initial charge and may be composed of monomers forming elastomeric polymers, or else of the other monomers mentioned above. Examples of suitable seed latices are those composed of polybutadiene or of polystyrene.

In another preferred embodiment, the graft base B1 may be prepared by what is known as the feed process. In this process, a certain proportion of the monomers forms an initial charge, the polymerization is then initiated, and the remainder of the monomers ("feed") B1 is then added as a feed during the course of the polymerization. The feed parameters (gradient shape, amount, duration, etc.) depend on the other conditions of the polymerization. The principles of the descriptions given in connection with the method of addition of the free-radical initiator and/or emulsifier are once again relevant here.

Graft copolymers having a number of "soft" and "hard" shells are also suitable, as described in EP-A 0 534 212, for example.

The precise polymerization conditions, in particular the type, amount, and method of addition of the emulsifier, and of the other polymerization auxiliaries, are preferably selected so that the resultant latex of the graft copolymer B has a median particle size, defined by the $d_{50}$ of the particle size distribution, of from 80 to 800 nm, preferably from 80 to 600 nm, and particularly preferably from 85 to 400 nm.

In one embodiment of the invention, the reaction conditions are balanced in such a way as to give the polymer particles a bimodal particle size distribution, i.e. a size distribution with at least two fairly well-developed maxima.

The bimodal particle size distribution is preferably achieved by (partial) agglomeration of the polymer particles. One way of achieving this is the following procedure: the monomers which form the core are polymerized to a conversion which is usually at least 90%, preferably greater than 95%, based on the monomers used. This conversion is generally achieved in from 4 to 20 hours. The resultant rubber latex has a median particle size $d_{50}$ of not more than 200 nm, and a narrow particle size distribution (an almost monodisperse system).

In the second stage, the rubber latex is agglomerated. This is generally done by adding a dispersion of an acrylate polymer. Preference is given to dispersions of copolymers of $C_1$–$C_4$-alkyl acrylates, preferably of ethyl acrylate, with from 0.1 to 10% by weight of monomers which form polar polymers, examples being acrylic acid, methacrylic acid, acrylamide, methacrylamide, N-methylolmethacrylamide, and N-vinylpyrrolidone. Particular preference is given to a copolymer made from 96% by weight of ethyl acrylate and 4% by weight of methacrylamide. The agglomerating dispersion may, where appropriate, also comprise more than one of the acrylate polymers mentioned.

The concentration of the acrylate polymers in the dispersion used for agglomeration should generally be from 3 to 40% by weight. The agglomeration process uses from 0.2 to 20 parts by weight, preferably from 1 to 5 parts by weight, of the agglomerating dispersion for each 100 parts of the rubber latex, the calculation in each case being based on solids. The agglomeration is carried out by adding the agglomerating dispersion to the rubber. The addition usually takes from about 1 to 30 minutes at from 20 to 90° C., preferably from 30 to 75° C., with the addition rate typically being uncritical.

Besides an acrylate polymer dispersion, use may also be made of other agglomerating agents, such as acetic anhydride, for agglomerating the rubber latex. Agglomeration by pressure or by freezing is also possible. The methods are known to the skilled worker.

Under the conditions mentioned, the rubber particles are only partially agglomerated, giving a bimodal distribution. More than 50%, preferably from 75 to 95%, of the particles (distribution by number) are generally in the non-agglomerated state after the agglomeration. The resultant partially agglomerated rubber latex is relatively stable, and it is therefore easy to store and transport without coagulation.

Another way of achieving bimodal particle size distribution of the graft copolymer B is to prepare, separately from one another and in the usual manner, two different graft copolymers B' and B" which differ in their median particle size, and to mix the graft copolymers B' and B" in the desired mixing ratio.

The conditions for preparing the graft B2 may be the same as those used for preparing the graft base B1, and the graft B2 may be prepared in one or more process steps. In two-step grafting, for example, it is possible first of all to polymerize styrene and/or α-methylstyrene alone, and then styrene and acrylonitrile, in two sequential steps. This two-step grafting (firstly styrene, then styrene/acrylonitrile) is a preferred embodiment. Further details concerning the preparation of the graft polymers B are given in DE-A 12 60 135 and 31 49 358, and also EP-A-0 735 063.

It is advantageous for the graft polymerization onto the graft base B1 also to be carried out in aqueous emulsion. It may be undertaken in the same system as used for polymerizing the graft base, in which case further emulsifier and initiator may be added. These do not have to be identical with the emulsifiers or initiators used for preparing the graft base B1. For example, it may be advantageous to use a persulfate as initiator for preparing the graft base B1, but a redox initiator system for polymerizing the graft shell B2. In other respects, that which has been said concerning the preparation of the graft base B1 is applicable to the selection of emulsifier, initiator, and polymerization auxiliaries. The monomer mixture to be grafted on may be added to the reaction mixture all at once, in portions in more than one step or, preferably, continuously during the course of the polymerization. If ungrafted polymers made from the monomers B2 are produced during the grafting of the graft base B1, the amounts of these, generally below 10% by weight of B2, are counted with the weight of component B.

Component C

Component C is a phyllosilicate. Suitable phyllosilicates are described, by way of example, in Hollemann, Wiberg, Lehrbuch der anorganischen Chemie, Walter de Gruyter, Berlin, N.Y. 1985, pp. 771–776.

Use is preferably made of serpentine types, such as chrytosile or antigorite, kaolinite types, such as dickite, nacrite, or halloysite, pyrophyllite, micaceous silicates from the vermiculite group, illite group, or montmorillonite/beidellite group, such as montmorillonite, or else mica, or an aluminosilicate, such as muskovite, phlogopite, or biotite. Very particular preference is given to mica. For the purposes of the present invention, kaolinite types include kaolin, the main mineral of which is kaolinite, and mica-like silicates include bentonite, the main mineral of which is montmorillonite.

Component D

For the purposes of the present invention, polycarbonates D are polycarbonates based on homopolycarbonates and on copolycarbonates. Examples of the bisphenols which may be used here are: dihydroxybiphenyls, bis(hydroxyphenyl) alkenes, bis(hydroxyphenol) ethers. However, it is also possible to use any of the other bisphenols suitable for preparing polycarbonates, these being described, inter alia, in the monograph H. Schnell, Chemistry and Physics of Polycarbonates, Interscience Publisher, New York, 1964, in U.S. Pat. No. 2,999,835 and in DE-A 22 48 817. Particular preference is given to polycarbonates based on 2,2-bis(4-hydroxyphenyl)propane. The synthesis of the polycarbonates is described, by way of example, in U.S. Pat. No. 2,999,835 and GB-A 7 72 627. Component D has a relative viscosity $\eta_{spec/c}$ in the range from 1.1 to 1.5 [ml/g], corresponding to average molecular weights $M_n$ in the range from 25,000 to 200,000.

Component E

Use may be made of other conventional auxiliaries and fillers as component E. Examples of substances of this type are lubricants, mold-release agents, waxes, pigments, dyes, flame retardants, antioxidants, stabilizers to counter the effect of light, fibrous or pulverulent fillers, fibrous or pulverulent reinforcing agents, and antistats, and also other additives, and mixtures of these.

Examples of suitable lubricants and mold-release agents are stearic acids, stearyl alcohol, stearic esters, stearamides, and also silicone oils, montan waxes, and those based on polyethylene or polypropylene.

Examples of pigments are titanium dioxide, phthalocyanines, ultramarine blue, iron oxides, and carbon black, and the entire class of organic pigments.

For the purposes of the present invention, dyes are any of the dyes which can be used for the transparent, semitransparent, or non-transparent coloring of polymers, in particular those dyes which are suitable for coloring styrene copolymers. Dyes of this type are known to the skilled worker.

Examples of suitable flame retardants are antimony oxides, such as $Sb_2O_3$, and/or halogenated organic compounds.

Particularly suitable antioxidants are sterically hindered mononuclear or polynuclear phenolic antioxidants, which may have various substituents and may also have bridging by substituents. These include both monomeric and oligomeric compounds, which may have been built up from two or more phenolic building blocks. It is also possible to use hydroquinones or hydroquinone analogs, or substituted compounds, or else antioxidants based on tocopherols or on derivatives of these. It is also possible to use mixtures of various antioxidants. In principle, use may be made of any compounds which are commercially available or are suitable for styrene copolymers, for example Topanol®, or Irganox.

Together with the phenolic antioxidants mentioned above by way of example, concomitant use may be made of what are known as costabilizers, in particular phosphorus- or sulfur-containing costabilizers. These P- or S-containing costabilizers are known to the skilled worker and are available commercially.

Examples of suitable stabilizer to counter the effect of light are various substituted resorcinols, salicylates, benzotriazoles, benzophenones, and HALS (hindered amine light stabilizers), for example those commercially available as Tinuvin®.

Examples of fibrous or pulverulent fillers are carbon fibers and glass fibers in the form of glass wovens, glass mats, or glass silk rovings, chopped glass, glass beads, and also wollastonite, particularly preferably glass fibers. When glass fibers are used, these may have been provided with a size and with a coupling agent to improve compatibility with the components of the blend. The glass fibers incorporated may either be in the form of short glass fibers or else in the form of continuous strands (rovings).

The amounts used of each of the additives are those which are usual, and it is therefore unnecessary to give further details in this connection.

The present invention also provides thermoplastic molding compositions built up from the following components:
  a: as component A, from 20 to 100% by weight, based on the entirety of components A+B, of a hard component made from one or more copolymers of styrene and/or α-methylstyrene with acrylonitrile, the proportion of acrylonitrile being less than 28% by weight,
  b: from 0 to 80% by weight, based on the entirety of components A+B, of at least one graft copolymer B made from
    b1: as component B1, from 10 to 90% by weight of at least one elastomeric particulate graft base with a glass transition temperature below 0° C., and
    b2: as component B2, from 10 to 90% by weight of at least one graft made from polystyrene or from a copolymer of styrene and/or α-methylstyrene with acrylonitrile, the proportion of acrylonitrile being less than 28% by weight, where the entirety of the components A+B used is from 10 to 100 parts by weight, based on the total weight of the components used,
  c: as component C, from 0.05 to 5 parts by weight, based on the total weight of the components used, of a phyllosilicate,
  d: as component D, from 0 to 90 parts by weight, based on the total weight of the components used, of at least one polycarbonate, and
  e: as component E, from 0 to 20 parts by weight, based on the total weight of the components used, of other conventional auxiliaries and fillers.

The preferred proportions of components A to E in the styrene copolymer are the preferred proportions listed above (at the outset).

Despite the low content of acrylonitrile, the thermoplastic molding compositions of the invention have excellent chemicals resistance.

Preparation of the Molding Compositions

The styrene copolymers with better chemicals resistance, built up from components A, C, and, where appropriate, B, D and E, using:
  a: as component A, from 20 to 100% by weight, based on the entirety of components A+B, of a hard component made from one or more copolymers of styrene and/or α-methylstyrene with acrylonitrile, the proportion of acrylonitrile being from 10 to 50% by weight, b: from 0 to 80% by weight, based on the entirety of components A+B, of at least one graft copolymer B made from b1: as component B1, from 10 to 90% by weight of at least one elastomeric particulate graft base with a glass transition temperature below 0° C., and b2: as component B2, from 10 to 90% by weight of at least one graft made from polystyrene or from a copolymer of styrene and/or α-methylstyrene with acrylonitrile, the proportion of acrylonitrile being from 10 to 50% by weight, where the entirety of the components A+B used is from 10 to 100 parts by weight, based on the total weight of the components used, c: as component C, from 0.05 to 5 parts by weight, based on the total weight of the components used, of a phyllosilicate, particularly preferably mica, d: as component D, from 0 to 90 parts by weight, based on the total weight of the components used, of at least one polycarbonate, and e: as component E, from 0 to 20 parts by weight, based on the total weight of the components used, of other conventional auxiliaries and fillers, are preferably prepared by separately preparing the individual components. The procedure is either that component A is combined with component C, and, where appropriate, intimately mixed with components B, D and E, and preferably extruded, or that all of the components are metered into an extruder.

In one preferred embodiment, A and C are combined in a tumbling mixer and, where appropriate, intimately mixed with component B, and, where appropriate, D and E, in an extruder. The resultant molding composition is then preferably extruded, rapidly cooled, and pelletized.

The proportion of acrylonitrile in components A, and, where appropriate, B2 of the styrene copolymers with increased chemicals resistance prepared by the process of the invention from components A, C and, where appropriate, B, D, and E is preferably less than 28% by weight, particularly preferably from 18 to 27% by weight, based on each appropriate component.

The preferred proportions of components A to E in the styrene copolymer are the preferred proportions listed above (at the outset).

The examples below give further illustration of the invention.

EXAMPLES

1. Preparation of Graft Copolymer B 1.1. Preparation of Graft Base B1

1.1.1. Polybutadiene Rubber as Graft Base (R1, Table 1)

43,120 g of butadiene are polymerized to give a polybutadiene latex in the presence of 432 g of tert-dodecyl mercaptan (TDM), 311 g of potassium salt of $C_{12}$–$C_{20}$ fatty acids, 82 g of potassium persulfate, 147 g of sodium hydrogen carbonate, and 58,400 g of water, at 65° C. The details of the process were as in EP-A-0 062 901, Ex. 1, p. 9, line 20-p. 10, line 6. The conversion was 95% or above. The median particle size $d_{50}$ of the latex was from 80 to 120 nm.

35,000 g of the resultant latex was agglomerated at 65° C. by adding 2700 g of a dispersion (solids content 10% by weight) made from 96% by weight of ethyl acrylate and 4% by weight of methacrylamide (partial agglomeration).

1.1.2 n-Butyl Acrylate Polymer as Graft Base (R2, Table 1)

The procedure was as in Examples V1 and V2 of EP-A-0 735 063, using an n-butyl acrylate polymer as graft base B1.

1.2. Preparation of Graft Copolymer B (Grafting of R1 or R2)

9000 g of water, 130 g of potassium salt of $C_{12}$–$C_{20}$ fatty acids, and 17 g of potassium peroxodisulfate were added to the agglomerated latex (R1 or R2). The monomer mixtures given in Table 2 were then added at 75° C. within a period of 4 hours, with stirring. Conversion, based on the graft monomers, was almost quantitative.

The resultant dispersion was mixed with an aqueous dispersion of an antioxidant, and then coagulated by adding a magnesium sulfate solution, and dried.

TABLE 1

| | Graft base B1 | |
|---|---|---|
| Example | R1 | R2 |
| Monomers [% by weight] | | |
| Butadiene | 100 | 0 |
| Crosslinker | 0 | 2 |
| n-Butyl acrylate | 0 | 98 |
| Properties: | | |
| Swelling index | 32 | |
| Gel content [%] | 70 | |

R1: Poly(butadiene) rubber
R2: Poly(butyl acrylate) rubber

TABLE 2

| Graft polymer B (Ba, Bb) | | |
|---|---|---|
| Component | Ba | Bb |
| Graft base from example | R2 | R1 |
| Monomers [% by weight] for graft B2 | | |
| Styrene | 75 | 80 |
| Acrylonitrile | 25 | 20 |

Ba: Poly(butyl acrylate) graft rubber with a graft made from styrene/acrylonitrile 75/25
Bb: Poly(butadiene) graft rubber with a graft made from styrene/acrylonitrile 80/20

2. Preparation of Polymers A

The thermoplastic polymers A were prepared by continuous solution polymerization, as described in Kunststoff-Handbuch, eds. R. Vieweg and G. Daumiller, Volume V "Polystyrol", Carl-Hanser-Verlag Munich 1969, pp. 122–124. Table 3 summarizes the compositions and properties.

TABLE 3

Thermoplastic polymers A (Aa, Ab)

| Monomers [% by weight] | Component Aa | Component Ab |
|---|---|---|
| Styrene | 75 | 76 |
| Acrylonitrile | 25 | 24 |
| Viscosity number VN [ml/g] | 81 | 67 |

Aa, Ab: Poly(styrene-co-acrylonitrile)

3. Component C

The component C used was the mica SX 400® from Microfine Materials.

4. Preparation of Blends from Components A, B, and C

4.1 Blending of components A and C

Component A was mixed with component C in a tumbling mixer.

4.2 Blending with Graft Rubber B After Drying

The graft rubber B was intimately mixed with the mixture of components A and C in an extruder, Werner and Pfleiderer model ZSK 30, at 250° C. and 250 rpm, with a throughput of 10 kg/h. The molding composition was extruded and the molten polymer mixture was subjected to rapid cooling by passing through a water bath at 30° C. The solidified molding composition was pelletized.

Table 4 lists various blends of components A, B, and C. 1c and 5c are comparative examples in which component C is absent.

TABLE 4

Blends

| Blend | Component Aa [parts by weight] | Component Ab [parts by weight] | Component Ba [parts by weight] | Component Bb [parts by weight] | Component C [parts by weight] |
|---|---|---|---|---|---|
| 1c | 70 | | 30 | | |
| 2 | 70 | | 30 | | 0.5 |
| 3 | 70 | | 30 | | 1.5 |
| 4 | 70 | | 30 | | 3 |
| 5c | | 70 | | 30 | |
| 6 | | 70 | | 30 | 1.5 |

5. Tests

Gasoline resistance test:
Storage in premium-grade gasoline at 23° C.
Test specimen: tensile specimen 170×10×4 mm (about 10.0 g)
Weight increase measure in % by weight after 1d, 2d, 3d, 4d (no DIN standard)

TABLE 5

Results

| Example | Weight increase (% by weight) 1d | Weight increase (% by weight) 2d | Weight increase (% by weight) 3d | Weight increase (% by weight) 4d |
|---|---|---|---|---|
| 1c | 48 | 82 | 113 | |
| 2 | 12 | 20 | 31 | |
| 3 | 10 | 15 | 20 | |
| 4 | 10 | 17 | 23 | |
| 5c | 17.3 | 26.6 | 35.4 | 42.3 |
| 6 | 13.5 | 20.2 | 25.9 | 30.9 |

We claim:

1. A method for improving the chemicals resistance, reducing the swelling, and improving the stress-cracking resistance of styrene-acrylonitrile copolymers having a proportion of acrylonitrile of less than 28% by weight, comprising the step of adding phyllosilicates to said styrene-acrylonitrile copolymers, wherein the styrene-acrylonitrile copolymers have been built up from components A, C, and, where appropriate, and E, using:
   a: as component A, from 20 to 100% by weight, based on the entirety of components A+B, of a hard component made from one or more copolymers of styrene and/or α-methylstyrene with acrylonitrile, the proportion of acrylonitrile being from 10 to less than 28% by weight,
   b: from 0 to 80% by weight, based on the entirety of components A+B, of at least one graft copolymer B made from
      b1: as component B1, from 10 to 90% by weight of at least one elastomeric particulate graft base with a glass transition temperature below 0° C., and
      b2: as component B2, from 10 to 90% by weight of at least one graft made from polystyrene or from a copolymer of styrene and/or α-methylstyrene with acrylonitrile, the proportion of acrylonitrile being from 10 to less than 28% by weight,
   where the entirety of the components A+B used is from 10 to 100 parts by weight, based on the total weight of the components used,
   c: as component C, from 0.05 to 5 parts by weight, based on the total weight of the components used, of a phyllosilicate, and
   e: as component E, from 0 to 20 parts by weight, based on the total weight of the components used, of other conventional auxiliaries and fillers, and
   wherein the phyllosilicate is mica.

2. The method as claimed in claim 1, wherein the chemical resistance is improved with respect to chemicals selected from alcohols, $C_3$–$C_8$ alkanes, gasoline, premium gasoline, diesel, halogenated hydrocarbons, hypochlorite salts, and sodium dichloroisocyanate dihydrate.

3. The method as claimed in claim 1, wherein the proportion of acrylonitrile is from 18 to 27% by weight.

4. A thermoplastic molding composition built up from components A, C, and where appropriate, and E, using
   a: as component A, from 20 to 100% by weight, based on the entirety of components A+B, of a hard component made from one or more copolymers of styrene and/or α-methylstyrene with acrylonitrile, the proportion of acrylonitrile being from 10 to less than 28% by weight,
   b: from 0 to 80% by weight, based on the entirety of components A+B, of at least one graft copolymer B made from b1: as component B1, from 10 to 90% by weight of at least one elastomeric particulate graft base with a glass transition temperature below 0° C., and b2: as component B2, from 10 to 90% by weight of at least one graft made from polystyrene or from a copolymer of styrene and/or α-methylstyrene with acrylonitrile, the proportion of acrylonitrile being from 10 to less than 28% by weight, where the entirety of the components A+B used is from 10 to 100 parts by weight, based on the total weight of the components used, c: as component C, from 0.05 to 5 parts by weight, based on the total weight of the components used, of a phyllosilicate, e: as component E, from 0 to 20 parts by weight, based on the total weight of the components used, of other conventional auxiliaries and fillers, wherein the phyllosilicate is mica.

5. A thermoplastic molding composition as claimed in claim 4, wherein the proportion of acrylonitrile is from 18 to 27% by weight.

6. A process for preparing the styrene polymers with improved chemical resistance as claimed in claim 4, which comprises separately preparing components A and C, and, where appropriate, components B, and E, combining component A with component C, and intimately mixing and then extruding the same with components B, and E, as appropriate.

7. A method for improving the chemicals resistance, reducing the swelling, and improving the stress-cracking resistance of styrene copolymers, which comprises adding to said copolymers an effective amount of mica.

8. A method as claimed in claim 1, wherein the amount of mica is from 0.15 to 3 parts by weight.

9. A thermoplastic molding composition as claimed in claim 4, wherein the amount of mica is from 0.15 to 3 parts by weight.

10. A process for preparing the styrene polymers with improved chemical resistance as claimed in claim 9, which comprises separately preparing components A and C, and, where appropriate, components B, and E, combining component A with component C, and intimately mixing and then extruding the same with components B, and E, as appropriate.

11. A method as claimed in claim 7, wherein the amount of mica is from 0.15 to 3 parts by weight.

12. A method as claimed in claim 1, wherein the amount of component E is from 0 to 15 parts by weight.

13. A thermoplastic molding composition as claimed in claim 4, wherein the amount of component E is from 0 to 15 parts by weight.

14. A process for preparing the styrene polymers with improved chemical resistance as claimed in claim 13, which comprises separately preparing components A and C, and, where appropriate, components B, and E, combining component A with component C, and intimately mixing and then extruding the same with components B, and E, as appropriate.

15. A method as claimed in claim 7, wherein the styrene copolymers comprise from 0 to 15 parts by weight of other conventional auxiliaries and fillers.

16. A method as claimed in claim 8, wherein the amount of component E is from 0 to 15 parts by weight.

17. A thermoplastic molding composition as claimed in claim 9, wherein the amount of component E is from 0 to 15 parts by weight.

18. A process for preparing the styrene polymers with improved chemical resistance as claimed in claim 17, which comprises separately preparing components A and C, and, where appropriate, components B, and E, combining component A with component C, and intimately mixing and then extruding the same with components B, and E, as appropriate.

19. A method as claimed in claim 11, wherein the styrene copolymers comprise from 0 to 15 parts by weight of other conventional auxiliaries and fillers.

* * * * *

UNITED STATES PATENT AND TRADEMARK OFFICE
CERTIFICATE OF CORRECTION

PATENT NO.         : 7,183,349 B1
APPLICATION NO. : 09/936353
DATED              : February 27, 2007
INVENTOR(S)        : Barghoorn et al.

It is certified that error appears in the above-identified patent and that said Letters Patent is hereby corrected as shown below:

In Claim 4, col. 12, indicated line 59:
 "appropriate, and E" should read --appropriate, B and E--

Signed and Sealed this

Twenty-fourth Day of July, 2007

JON W. DUDAS
*Director of the United States Patent and Trademark Office*